United States Patent
Lenssen et al.

(10) Patent No.: US 9,977,308 B2
(45) Date of Patent: May 22, 2018

(54) CONTROLLABLE LIGHT-TRANSMISSIVE ELEMENT

(71) Applicant: PHILIPS LIGHTING HOLDING B.V., Eindhoven (NL)

(72) Inventors: Kars-Michiel Hubert Lenssen, Eindhoven (NL); Marius Leendert Borst, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 51 days.

(21) Appl. No.: 15/037,671

(22) PCT Filed: Nov. 18, 2014

(86) PCT No.: PCT/EP2014/074820
§ 371 (c)(1),
(2) Date: May 18, 2016

(87) PCT Pub. No.: WO2015/075007
PCT Pub. Date: May 28, 2015

(65) Prior Publication Data
US 2016/0291440 A1    Oct. 6, 2016

(30) Foreign Application Priority Data
Nov. 19, 2013 (EP) ..................................... 13193442

(51) Int. Cl.
*G02B 26/00* (2006.01)
*G02F 1/167* (2006.01)
*E06B 9/24* (2006.01)

(52) U.S. Cl.
CPC ................ *G02F 1/167* (2013.01); *E06B 9/24* (2013.01); *E06B 2009/2417* (2013.01);
(Continued)

(58) Field of Classification Search
CPC ................................. G02F 1/167; E06B 9/24
(Continued)

(56) References Cited

U.S. PATENT DOCUMENTS

2007/0120814 A1 * 5/2007 Moriyama ............. G02F 1/167
345/107
2007/0195399 A1   8/2007 Aylward et al.
(Continued)

FOREIGN PATENT DOCUMENTS

KR    2012011532 A    2/2012
WO    2011126554 A1   10/2011
(Continued)

OTHER PUBLICATIONS

Lenssen, Kars-Michiel H. et al, "Novel Concept for Full-Color Electronic Paper", Journal of the SID 17/4, 2009, pp. 383-388.

*Primary Examiner* — James Greece

(57) ABSTRACT

The present invention relates to a light-transmissive element (106, 200, 500) which has light controlling properties. The light-transmissive element (106, 200, 500) comprises a plurality of first particles (206) and a plurality of second particles (208). The first particles (206) are configured to control the transmission of light of a first wavelength range being infrared light. The second particles (208) are configured to control the transmission of light of a second wavelength range being visible light. The first (206) and second particles (208) may independently be redistributed in an enclosure (207) enclosing the particles. Redistribution is enabled by an applied electric field which causes the particles to move in the enclosure (207). Thus, transmission of light of the first wavelength range and transmission of light of the second wavelength range is thereby independently controlled by the first (206) and second particles (208) respectively.

14 Claims, 3 Drawing Sheets

(52) U.S. Cl.
CPC .............. *E06B 2009/2464* (2013.01); *G02F 2001/1678* (2013.01); *G02F 2201/16* (2013.01); *G02F 2203/04* (2013.01); *G02F 2203/11* (2013.01); *G02F 2203/48* (2013.01)

(58) Field of Classification Search
USPC .......................................................... 359/296
See application file for complete search history.

(56) References Cited

U.S. PATENT DOCUMENTS

| | | |
|---|---|---|
| 2009/0296188 A1 | 12/2009 | Jain et al. |
| 2010/0208328 A1 | 8/2010 | Heikenfeld et al. |
| 2012/0019891 A1 | 1/2012 | Dewell |
| 2013/0328943 A1* | 12/2013 | Bita .................... G09G 3/3466 345/690 |

FOREIGN PATENT DOCUMENTS

| | | |
|---|---|---|
| WO | 2013003548 A2 | 1/2013 |
| WO | 2014118672 A2 | 8/2014 |

\* cited by examiner

CONTROLLABLE LIGHT-TRANSMISSIVE ELEMENT

CROSS-REFERENCE TO PRIOR APPLICATIONS

This application is the U.S. National Phase application under 35 U.S.C. § 371 of International Application No. PCT/EP2014/074820, filed on Nov. 18, 2014, which claims the benefit of European Patent Application No. 13193442.4, filed on Nov. 19, 2013. These applications are hereby incorporated by reference herein.

FIELD OF THE INVENTION

The present invention relates to a light-transmissive element for independently controlling the transmission of heat and visible light through a window. In particular, the present invention relates to light controlling foils and windows able to separately control the transmission of visible and infrared light.

BACKGROUND OF THE INVENTION

Conventional windows arranged for example in buildings or vehicles have a fixed transmission of light independent of the wavelength of the light. For example, visible light and infra-red light passes easily through a conventional window. Infra-red light (i.e. heat) may thus easily leave e.g. a building through a window of the building, leading to unnecessary losses of heat. In order to compensate for the losses more power is needed for heating the inside of the building to provide a comfortable environment for e.g. people on the inside of the building. Additionally, heat may easily enter through a window which may lead to increased power consumption for cooling the building e.g. in a hot climate. Furthermore, sometimes it may be desirable to block visual light but not heat, for example on a sunny but cold day, in order to reduce glare but still make use of heat coming from the outside.

Recently, so called "smart windows" were introduced on the market. A "smart window", common in the automotive industry, is able to adjust the transmission of light through the window. A device able to control transmission of light, thus a "smart window" is disclosed by WO-2013/003548. In WO-2013/003548, electrochromic cells are used for controlling a transmission of light. The device disclosed by WO-2013/003548 comprises several layers of cells for controlling the transmission of light of different wavelengths. Furthermore, the device requires layers of electrolyte and electrodes comprising single walled carbon nanotubes for properly operating the device.

In view of prior art, there is a need for a device allowing for independently controlling a transmission of heat and visible light with a less complicated structure.

SUMMARY OF THE INVENTION

In view of the above-mentioned and other drawbacks of the prior art, a general object of the present invention is to provide a device for independently controlling transmission of light of infrared light and visible light, respectively, through the device.

According to a first aspect of the invention there is provided a light-transmissive element comprising a plurality of first particles and a plurality of second particles enclosed within an enclosure. The enclosure has at least two substantially planar optically transmissive wall members arranged opposing each other such that transmission of light through the light-transmissive element is enabled through the optically transmissive wall members. A distribution of the plurality of first particles is controllable, by a first electric field applied in a plane parallel to the wall members, to predominantly control the amount of light within a first wavelength range, corresponding to substantially infrared light, being transmitted through the light-transmissive element. A distribution of the plurality of second particles is controllable, by a second electric field, different from the first electric field, applied in the plane parallel to the wall members, to predominantly control the amount of light within a second wavelength range, corresponding to substantially visible light, being transmitted through the light-transmissive element.

In the context of the present invention, the term "infrared light" is used to indicate electromagnetic radiation with wavelengths in a range of about 700 nanometers to about 2.5 millimeters, while the term "visible light" is used to indicate electromagnetic radiation with wavelengths in a range of about 400 nanometers to about 700 nanometers. The adverb "substantially" is used to indicate that there may be some overlap between the first and second wavelength ranges. For example, the wavelength range of infrared light may have a lower limit of 650 nanometers and the wavelength range of visible light may have an upper limit of 750 nanometers. Some overlap of these wavelength ranges is by no means limiting for the invention and should therefore not limit the scope of the invention.

The present invention is based on the realization that light of different wavelength ranges corresponding to infrared light and visible light may be controlled (e.g. blocked) by different types of particles, respectively. The particles may have properties such that the particles may be manipulated, for example translated in the plane in which an electric field is applied. In the light-transmissive element of the invention, the plurality of first particles is arranged to predominantly control infrared radiation, and the plurality of second particles is arranged to predominantly control visible radiation. In other words, the transmission of infrared radiation through the light-transmissive element is predominantly controlled by the plurality of first particles, while the transmission of visible radiation through the light-transmissive element is predominantly controlled by the plurality of second particles. In the context of the present invention, the adverb "predominantly" is used to indicate a difference in magnitude of at least about an order of magnitude.

Furthermore, the invention is based on the realization that more than one type of particles may be suspended in a suspension such that the different types of particles (i.e. the first and second particles) may be independently controllable by different applied electric fields. Thereby, the transmission of light of different wavelength ranges through the suspension, thus through the light-transmissive element, may be independently controlled. The wall members are configured to hold the suspension of particles in place. Furthermore, the wall members are arranged such that light is transmitted through one of the wall members before the light enters the suspension of particles.

In the present context, a substantially planar wall member does not rule out that the light transmissive element may be curved over a large area. For example, the wall member may have a radius of curvature being large compared to the dimension of an extension of the wall member, thus being locally substantially planar. A curved light transmissive element may for example be used in a car windshield.

An electric field applied in a plane parallel to the layer of the suspended particles allows for flexible control of a distribution of particles in the plane of the suspension. For example, by translating the first or second particles in the plane of the suspension for controlling transmission of infrared light or visible light respectively. Furthermore, applying the electric field in a plane parallel to the layer of the suspended particles allows for electrodes for generating the electric field to be placed such that the electrodes does not block the light propagating through the light-transmissive element. An electric field applied in the plane does not exclude that there may be electric field components in other directions, e.g. perpendicular to the plane of the wall members.

Controlling transmission of infrared light and visible light independently enables controlling transmission of heat independent of the transmission of visible light through the light-transmissive element. Thereby, heat may be transmitted through the light-transmissive element while reducing glare from e.g. the sun by at least partly blocking visible light, or heat may be at least partly blocked while allowing visible light through the light-transmissive element, or any other combination of at least partly blocking/allowing transmission of heat (infrared light) and/or visible light.

According to one embodiment of the invention, the first particles may be charged particles configured to reflect light of the first wavelength range and transmit light of the second wavelength range, and the second particles may be charged particles configured to absorb light of the second wavelength range and transmit light of the first wavelength range. Providing the particles with charges enables an efficient control the distribution of particles through the applied electric field. The first particles have properties which make them reflective to light of the first wavelength range but not light of the second wavelength range. Similarly, the second particles have properties which make them absorb light of the second wavelength range but not light of the first wavelength range. The particles may be made from organic, metallic or semiconducting materials. For example, the first particles may be made from PMMA, aluminum, gold, silver, titanium, copper, or cadmium stannate. PMMA is advantageously used because it is substantially reflective (or absorbent) for infrared light but allow visible light to be transmitted through the material. Furthermore, particles made from e.g. PMMA may be conveniently manufactured with suitable sizes larger than 0.5 micrometers, such that e.g. PMMA particles may have a size in a specific size range arranged to selectively reflect infrared radiation.

According to one embodiment of the invention, the plurality of first particles is arranged in a first compartment and the plurality of second particles is arranged in a second compartment separated from the first compartment by a transparent wall member, the second compartment being arranged in parallel and stacked with the first compartment. Thus, the particles are arranged such that they are separated from each other. The two compartments are stacked in layers such that incoming light is transmitted through one (e.g. a first layer) of the first and second compartments before the incoming light is transmitted thought the other compartment (e.g. a second layer). Arranging the particles for controlling transmission of light in separate layers allows for flexibility designing each layer having a light controlling property for a certain wavelength range. For example, it may be desirable to have a thicker layer of e.g. infrared controlling layer for more efficiently reducing a transmission of infrared light compared to the efficiency in reducing a transmission of visible light.

According to one embodiment of the invention, the first particles are configured such that a concentration of the first particles is more inhomogeneous across the enclosure when the first electric field is applied, wherein the transmission of light of the first wavelength range is modified proportionally to a magnitude and/or direction of the first applied electric field, and wherein the second particles are configured such that a concentration of the second particles is more inhomogeneous across the enclosure when the second electric field is applied and wherein the transmission of light of the second wavelength range is modified proportionally to a magnitude and/or direction of the second applied electric field. In other words, when for example the first electric field is applied the first particles are redistributed such that they accumulate over a smaller volume in the enclosure compared to without the applied electric field. Thereby, light of the first wavelength range is allowed to be transmitted through the enclosure. When a concentration of either the first and/or second particles is inhomogeneous, the particles are not evenly spread across the extension of the enclosure. Thus, in an inhomogeneous concentration particles are collected (accumulated) over sub-volumes smaller than the volume of the enclosure. In other words, the average distance between the first particles decreases when the first electric field is applied. For example, the first particles may be accumulated at an edge of the enclosure. Similarly, the average distance between the second particles decreases when the second electric field is applied.

Furthermore, if the magnitude of the first (second) electric field is increased, or if the direction of the electric field is changed such that the field in the plane of the substantially planar enclosure is increased, the transmission of light of the first (second) wavelength range may increase proportionally with the increased electric field. Moreover, if the magnitude of the first (second) electric field is decreased, reduced to zero, or if the direction of the electric field is changed such that the field component in the plane of the substantially planar enclosure is decreased, the transmission of light of the first (second) wavelength range may decrease proportionally to the decreased electric field. For example, if the magnitude of the electric field is changed by e.g. 10%, the transmission of light may be changed by for example 20%, 10%, 5% or another percentage depending e.g. properties of the suspension of the first and the second particles and/or on the particles themselves. The properties determining the proportionality between the field and the transmission may for example be a strength and/or polarity of charges on the particles, in other words a functionalization of the particles, and/or charges in the suspension carrying the particles. Thereby, a coupling between an applied electric field and the particles is modified.

In one embodiment of the present invention, the first particles may have dimensions larger than 0.5 micrometer. In order to efficiently control the transmission, of infrared light (in particular near infrared light with wavelengths in the lower range of wavelengths of infrared light) the particles should have dimensions larger than approximately 0.5 micrometer.

In one embodiment of the present invention, the second particles may have dimensions smaller than 400 nanometers. In order to avoid undesired light scattering (which could for example cause haze or opaqueness) the particles should not be too large, preferably smaller than the wavelength of visible light. An appropriate size is smaller than 400 nanometers, for example 100 nanometers.

According to one embodiment of the invention, the second particles may be made from charged pigment particles configured to absorb light of the second wavelength range and transmit light of the first wavelength range. Such particles may for example be black pigment particles, particles with a shell enclosing a dye, or pigments embedded in a transparent matrix. Transmission of infrared light through the plurality of second particles is possible due to the small dimension of the second particles compared to the wavelength of infrared light.

According to one embodiment of the invention, the light transmissive element may further comprise a first substrate comprising a cavity on a first side, and a second substrate arranged in contact with the first substrate such that the enclosure is formed from the cavity and the second substrate. In other words, the wall members of the present invention may be substrates where a first substrate comprises a cavity. When the second substrate is arranged in contact, and in parallel, with the first substrate the cavity, if enclosed by the second substrate, forms an enclosure. The substrates may be made from e.g. PET or glass, and a resin may be used for holding the substrates together.

According to one embodiment of the present invention, the light-transmissive element is provided in the form of a flexible film or foil. A film or a foil is a sheet material which may be flexible and may easily be attached to a surface. Thus, arranging the suspension comprising the particles within a film or a foil facilitates applying the light transmissive element to a surface where controllable light transmission properties may be desirable.

According to one embodiment of the present invention, the light-transmissive element may further comprise a rigid optically transmissive support structure arranged in contact with and in parallel with at least one of the optically transparent wall members. An optically transmissive support structure may be a window arranged in e.g. a building, a vehicle, etc. A window is a sheet material which may be made from glass or a similar optically transmissive material. The window may for example be held in place by a frame arranged in an opening of the building or vehicle. Arranging a light-transmissive element according to the invention in a plane parallel to the window surface allows for controlling the transmission of light of different wavelength ranges, e.g. infrared light and visible light, through the window. Furthermore, by stacking the light-transmissive element, for example in the form of a film or a foil, on the surface of a conventional window it is possible to obtain a window with only a selective portion of the window area having light-transmission controlling properties. Hence, other portions of the window where light is transmitted through may be only the window material, for example glass which may be close to optically transparent, and/or other portions of the window may have controlling properties for controlling predominantly one of the first and the second wavelength ranges.

In one embodiment of the present invention, the optically transmissive support structure may comprise an energy generating unit arranged and configured to provide energy for generating the electric field. By allowing energy to be supplied by an energy generating unit arranged adjacent or within the optically transmissive support structure, a single unit comprising the optically transmissive support structure, for example a window, and means for providing energy for controlling the transmission of light through the window is possible. Thereby, a self-sustained unit may be obtained which is environmentally friendly at least in terms of energy consumption. The energy harvesting unit may advantageously be a solar cell or a radio-frequency receiver unit for receiving wireless power. For example a radio-frequency receiver unit may be provided with an antenna which may receive wireless power from a remote transmitter. In one example coil-like structure is arranged around an edge of the light-transmissive element or transparent conductors are used as a radio-frequency receiver.

According to one embodiment of the present invention, a light-transmissive element may be sandwiched between a first and a second rigid optically transmissive support structure. Hence, the light-transmissive element may be arranged within the optically transmissive support structure, thus within the material of the optically transmissive support structure. An optically transmissive support structure may for example be a window which may be made from glass or a similar material. In one example, the light-transmissive element is sandwiched between the materials, such as glass, of the window. By applying a sandwich structure, the light-transmissive element may be replaced without the need for replacing the glass window in case of a broken light-transmissive element, or a broken window may be replaced separate from the light-transmissive element. Thus maintenance of the window and the light-transmissive element is facilitated.

According to a second aspect of the invention there is provided a method of controlling a transmission of light through a light-transmissive element, the light-transmissive element comprising: a plurality of first particles and a plurality of second particles enclosed in a substantially planar enclosure comprising at least two optically transmissive wall members arranged opposing each other such that transmission of light through the light-transmissive element is enabled through the optically transmissive wall members, wherein the first particles and the second particles are controllable by an electric field applied in a plane parallel to the wall members, the method comprising controlling the transmission of light predominantly within a first wavelength range through applying a first electric field such that a distribution of the first particles is modified, and controlling the transmission of light predominantly within a second wavelength range by applying a second electric field, different from the first electric field, such that a distribution of the second particles is modified.

In one embodiment of the present invention, the transmission of light of the first wavelength range is modified proportionally to a magnitude and/or direction of the first applied electric field, and wherein the transmission of light of the second wavelength range is modified proportionally to a magnitude and/or direction of the second applied electric field.

Effects and features of this second aspect of the present invention are largely analogous to those described above in connection with the first and the second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

DETAILED DESCRIPTION OF THE EMBODIMENTS

In the following description, the present invention is mainly described with reference to a window arranged in a building, for example an office building. It should, however, be noted that this by no means limits the scope of the invention, which is equally applicable to other applications, such as windows in vehicles or any other application where control of transmission of visible light and infrared light is desirable.

Figure 1:
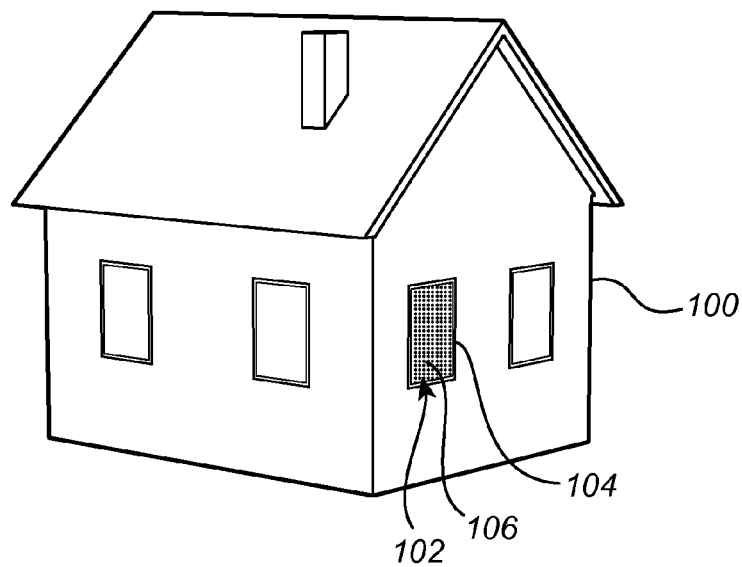
FIG. 1 illustrates an exemplary application of a light-transmissive element according to an embodiment of the invention.

FIG. 1 illustrates an exemplary application of an embodiment of the present invention. FIG. 1 shows a building 100 with a window 102 arranged in an opening 104 of the building. The window comprises a light-transmissive element 106 arranged in a plane parallel to the window 102 material. The light-transmissive element 106 is configured to separately control the transmission of visible light and infrared light through the window 102. The light-transmissive element 106 may for example be in the form of a foil attached to a surface of the window 102.

Figure 2:
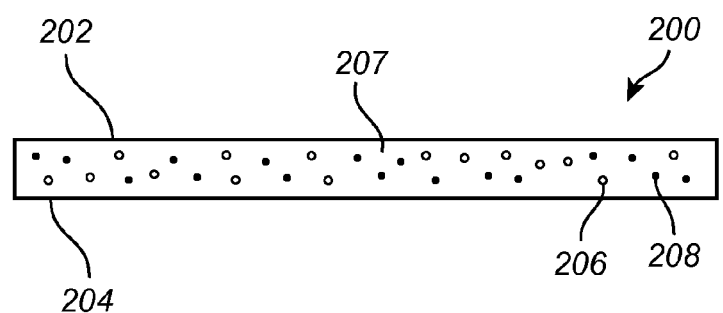
FIG. 2 illustrates a light-transmissive element according to an embodiment of the invention.

FIG. 2 illustrates an exemplary embodiment of the invention. FIG. 2 shows a light-transmissive element 200 having a first wall member 202 and a second wall member 204. The first 202 and second 204 wall members are arranged opposing each other such that incoming light from a direction of for example the outside of the first wall member 202 may be transmitted through the light-transmissive element 200 through the wall members 202, 204. Furthermore, a plurality of first particles 206 and a plurality of second particles 208 are arranged in an enclosure 207 formed by the wall members 202, 204. A distribution of the first particles is controllable by applying an electric field in a plane parallel to the wall members 202, 204. Similarly, a distribution of the second particles is controllable by applying a second electric field in the plane parallel to the wall members 202, 204. By controlling the distribution of the first particles an amount of light within a first wavelength range corresponding to infrared light being transmitted through the light-transmissive element is predominantly controlled. In other words, by changing the distribution of the first particles in the light-transmissive element, predominantly the transmittance of infrared light through the light-transmissive element is modified. Similarly, by controlling the distribution of the second particles an amount of light within a second wavelength range corresponding to visible light being transmitted through the light-transmissive element is predominantly controlled. In one example, the first particles are functionalized PMMA particles configured to reflect light of the first wavelength range corresponding to infrared light, and the second particles are black pigment particles configured to absorb visible light. The pigment particles may also have other colors than black. In one embodiment, the transmission of light of the first and the second wavelength range is modified proportionally to a magnitude the first and the second applied electric field applied in the plane of the wall members 202, 204. The first 206 and second 208 particles may be suspended in a liquid such as a branched-chain alkane (for example isopar) or a linear alkane (for example dodecane).

Figure 3:
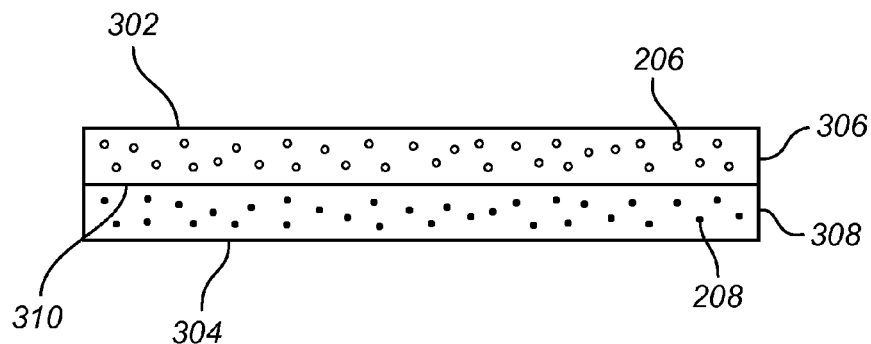
FIG. 3 illustrates a light-transmissive element according to an embodiment of the invention.

FIG. 3 illustrates an exemplary embodiment of the invention. FIG. 3 shows a light-transmissive element 300 comprising a first 302 and a second wall member 304 arranged opposing each other. There is further a plurality of first particles 206 arranged in a first compartment 306 and a plurality of second particles 208 arranged in a second compartment 308. Furthermore, the second compartment 308 is separate from the first compartment 306 and is arranged in parallel and stacked with the first compartment 306. Furthermore, there is an optically transmissive wall member 310 separating the first 306 and the second compartment 308. In yet another example, the first 306 and second 308 compartments are separated by two wall members such that the first and the second layers may be physically separated from each other into two separate units each having light controllable light transmission properties corresponding to the respective particles 206, 208 suspended in each layer 306, 308.

Figure 4A:
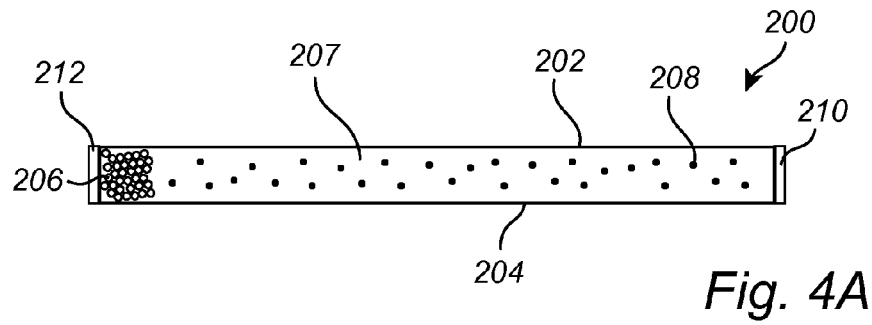
FIGS. 4a-b illustrates a method of controlling light-transmissive element according to an embodiment of the invention.
Figure 4B:
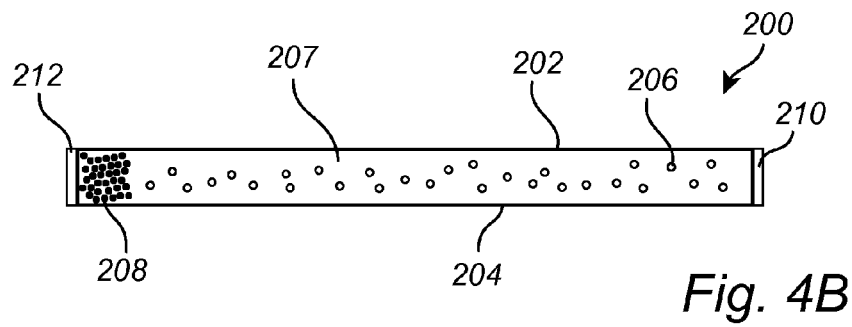

FIGS. 4a-b illustrate a method of controlling an amount of light transmitted through a light-transmissive element 200 similar to the light-transmissive element depicted in FIG. 1. In FIG. 4a-b electrodes 210, 212 are arranged on two sides of the light-transmissive element 200. The electrodes are configured to generate an electric field extending between the first electrode 210 and the second electrode 212 such that the electric field is applied in a plane parallel to the wall members 202, 204. Power for generating the electric field may be provided from an energy generating unit such as a solar cell or radio-frequency receiver unit for receiving wireless power. In FIG. 4a a first electric field is applied in the plane of the wall members 202, 204. The first electric field causes a distribution of the first particles 206 to be modified. In FIG. 4a, the first particles 206 are accumulated on the left side of the light-transmissive element 200 which allows for an increased amount of light of the first wavelength range corresponding to infrared light to be transmitted through the light-transmissive element 200. Thus, a concentration of first particles is inhomogeneous across the enclosure 207. Similarly, the second electric field causes a distribution of the second particles 206 to be modified as is shown in FIG. 4b. In FIG. 4b, the second particles 206 are accumulated on the left side of the light-transmissive element 200 which allows for an increased amount of light of the second wavelength range corresponding to visible light to be transmitted through the light-transmissive element 200. Thus, a concentration of second particles is inhomogeneous across the enclosure 207. Naturally, the first and the second particles may move to any side of the light-transmissive element as long as the transmission of light is modified by the change of distribution of the first and/or the second particles.

Figure 5:
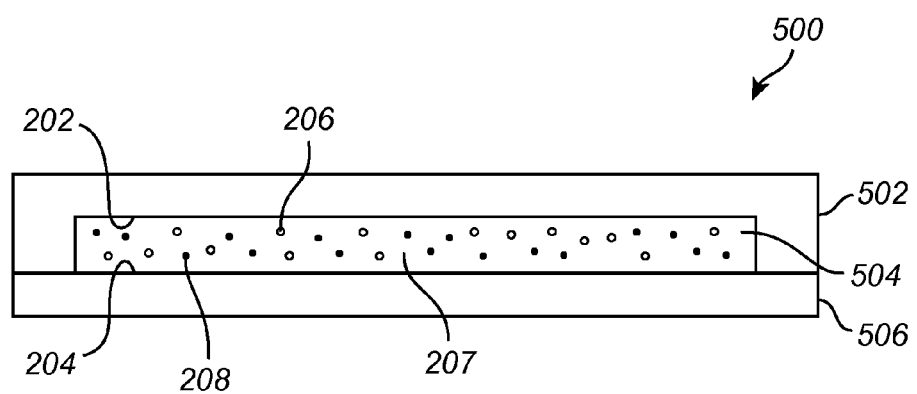
FIG. 5 illustrates a light-transmissive element according to an embodiment of the invention.

FIG. 5 illustrates an exemplary embodiment of the invention. FIG. 5 illustrates a light-transmissive element 500 comprising first substrate 502 comprising a cavity 504 on a first side, and a second substrate 506 arranged in contact with the first substrate 502 such that the enclosure 207 is formed from the cavity and the second substrate. In other words the wall members 202, 204 may be in the form of substrates where a first substrate has a cavity 504 located on a side of the substrate. A second substrate 506 is then attached to cover the cavity 504 of the first substrate 502, thus the second substrate 506 is arranged in parallel with the first substrate 502 such that an enclosure 207 is formed between the first 502 and the second 506 substrate by the cavity. The substrates may be made from e.g. PET or glass, and a resin may be used for holding the substrates together. Moreover, the substrates may be made from glass with the cavity formed by SU-8 through a lithography process.

Additionally, variations to the disclosed embodiments can be understood and effected by the skilled person in practicing the claimed invention, from a study of the drawings, the disclosure, and the appended claims. For example, the particles may be made from materials other than in the examples described herein such as organic, metallic or semiconducting materials. Examples for the first particles are PMMA, aluminum, gold, silver, titanium, copper, or cadmium stannate. Furthermore, the position of the electrodes for generating the electric fields are exemplary and may be located at other position as long as an electric field is generated with at least a portion of the fields lines extending in a plane parallel to the wall members such that the particles may be controlled. For example the electrodes may be located in a plane parallel to the wall members. Furthermore, although depicted as planar, the wall members may have a shape being only close to planar. In other words, the wall members may have curvature being close to planar, such as with a radius of curvature being large compared to a dimension of an extension of the light-transmissive element.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light-transmissive element for independently controlling the transmission of heat and visible light through a window,
   wherein the light-transmissive element comprises a plurality of first particles and a plurality of second particles, enclosed within an enclosure, the enclosure comprising two substantially planar optically transmissive wall members arranged opposing each other such that transmission of light through the light-transmissive element is enabled through the optically transmissive wall members,
   wherein a distribution of the plurality of first particles is controllable, by a first electric field applied in a plane parallel to the wall members, to predominantly control the amount of light within a first wavelength range being transmitted through the light-transmissive element, the first wavelength range corresponding to substantially infrared light,
   wherein a distribution of the plurality of second particles is controllable, by a second electric field, different from the first electric field, applied in the plane parallel to the wall members, to predominantly control the amount of light within a second wavelength range being transmitted through the light-transmissive element, the second wavelength range corresponding to substantially visible light, and
   wherein the first particles are charged particles configured to reflect light of the first wavelength range and to transmit light of the second wavelength range, and wherein the second particles are charged particles configured to absorb light of the second wavelength range and to transmit light of the first wavelength range.

2. The light-transmissive element according to claim 1, wherein the plurality of first particles is arranged in a first compartment, and wherein the plurality of second particles is arranged in a second compartment separated from the first compartment by a transparent wall member, the second compartment being arranged in parallel with and stacked with the first compartment.

3. The light-transmissive element according to claim 1, wherein the first particles are configured such that a concentration of the first particles is more inhomogeneous across the enclosure when the first electric field is applied, wherein the transmission of light of the first wavelength range is modified proportionally to a magnitude and/or direction of the first applied electric field, and wherein the second particles are configured such that a concentration of the second particles is more inhomogeneous across the enclosure when the second electric field is applied and wherein the transmission of light of the second wavelength range is modified proportionally to a magnitude and/or direction of the second applied electric field.

4. The light-transmissive element according to claim 1, wherein the first particles have dimensions larger than 0.5 micrometer.

5. The light-transmissive element according to claim 1, wherein the second particles have dimensions smaller than 400 nanometers.

6. The light-transmissive element according to claim 1, further comprising a first substrate comprising a cavity on a first side, and a second substrate arranged in contact with the first substrate such that the enclosure is formed from the cavity and the second substrate.

7. The light-transmissive element according to claim 1, wherein the light-transmissive element is provided in the form of a flexible film or foil.

8. The light-transmissive element according to claim 1, further comprising a rigid optically transmissive support structure arranged in contact with and in parallel with at least one of the optically transmissive wall members.

9. The light-transmissive element according to claim 8, further comprising an energy generating unit arranged and configured to provide energy for generating the electric field.

10. The light-transmissive element according to claim 9, wherein the energy generating unit is a solar cell or a radio-frequency receiver unit for receiving wireless power.

11. A window comprising a light-transmissive element according to claim 1 sandwiched between a first and a second rigid optically transmissive support structure.

12. A method of independently controlling a transmission of heat and visible light through a window using a light-transmissive element, wherein the light-transmissive element comprises a plurality of first particles and a plurality of second particles enclosed in a substantially planar enclosure comprising two optically transmissive wall members arranged opposing each other such that transmission of light through the light-transmissive element is enabled through the optically transmissive wall members, the first particles and the second particles being controllable by an electric field applied in a plane parallel to the wall members, and wherein the method comprises the steps of:
   predominantly controlling the transmission of light within a first wavelength range through applying a first electric field such that a distribution of the first particles is modified, the first wavelength range corresponding to substantially infrared light, and
   predominantly controlling the transmission of light within a second wavelength range by applying a second electric field, different from the first electric field, such that a distribution of the second particles is modified, the second wavelength range corresponding to substantially visible light, wherein the first particles are charged particles configured to reflect light of the first wavelength range and to transmit light of the second wavelength range, and wherein the second particles are charged particles configured to absorb light of the second wavelength range and to transmit light of the first wavelength range.

13. The method according to claim 12, wherein the transmission of light of the first wavelength range is modified proportionally to a magnitude and/or direction of the first applied electric field, and wherein the transmission of light of the second wavelength range is modified proportionally to a magnitude and/or direction of the second applied electric field.

14. A light-transmissive element for independently controlling the transmission of heat and visible light through a window,
wherein the light-transmissive element comprises a plurality of first particles and a plurality of second particles, enclosed within an enclosure, the enclosure comprising two substantially planar optically transmissive wall members arranged opposing each other such that transmission of light through the light-transmissive element is enabled through the optically transmissive wall members,
wherein a distribution of the plurality of first particles is controllable, by a first electric field applied in a plane parallel to the wall members, to predominantly control the amount of light within a first wavelength range being transmitted through the light-transmissive element, the first wavelength range corresponding to substantially infrared light,
wherein a distribution of the plurality of second particles is controllable, by a second electric field, different from the first electric field, applied in the plane parallel to the wall members, to predominantly control the amount of light within a second wavelength range being transmitted through the light-transmissive element, the second wavelength range corresponding to substantially visible light, and
wherein the first particles are charged particles configured to reflect light of the first wavelength range and to transmit light of the second wavelength range, resulting in the light-transmissive element being substantially transparent to visible light passing through the light-transmissive element in a direction substantially orthogonal to the wall members; and wherein the second particles are charged particles configured to absorb light of the second wavelength range and to transmit light of the first wavelength range.

* * * * *